Patented Aug. 7, 1945

2,381,138

UNITED STATES PATENT OFFICE 2,381,138

2-HALOGENOETHOXY SILICON COMPOUNDS

Winton I. Patnode and Robert O. Sauer, Schenectady, N. Y., assignors to General Electric Company, a corporation of New York No Drawing. Application May 14, 1942,
Serial No. 443,023

5 Claims. (Cl. 260—462)

This invention relates to 2-halogenoethoxy silicon compounds. It is particularly concerned with novel 2-halogenoethoxy silanes (including substituted silanes) having the general formula $$R_aR'_bSi(OCH_2CH_2X)_{(4-a-b)}$$

wherein R is a member of the class consisting of hydrogen and monovalent hydrocarbon radicals, R' is a member of the class consisting of monovalent hydrocarbon radicals and $XCH_2CH_2O—$ radicals, X is a halogen atom selected from the group consisting of chlorine and bromine, and $a$ and $b$ are integers equal to at least one and not more than three and the sum of $a+b$ is not greater than 3.

The monovalent hydrocarbon radicals represented by R and R' in the above formula may be any suitable alkyl and aryl (including alkaryl and aralkyl) radicals, e. g. methyl, ethyl, propyl, butyl, phenyl, tolyl, xylyl, mono-, di-, and triethyl phenyl, naphthyl, etc. radicals.

Our copending application Serial No. 443,022, filed concurrently herewith, describes and claims a method for the preparation of 2-chloroethyl silicate, having the formula $(ClCH_2CH_2O)_4Si$, by reacting silicon tetrachloride with ethylene oxide. The present application relates to novel 2-halogenoethyl ethers obtained from substituted halogenosilanes and ethylene oxide. The reaction between the halogenosilane and ethylene oxide suitably may be represented by the equation:

$$R_aR'_bSi(OCH_2CH_2X)_{(4-a-b)}$$

wherein R, R', X, $a$ and $b$ represent the radicals and integers hereinbefore indicated.

Since even the freshly distilled halogenosilanes contain a small concentration of hydrogen halide, probably resulting from hydrolysis of the halogenosilane by moisture taken for example from the atmosphere, it is possible that the hydrogen halide acts as a catalyst for the reaction between the silane and ethylene oxide. However, the fact that the reaction proceeds smoothly and quickly to give good yields of the 2-halogenoethyl esters without the introduction of additional hydrogen halide would seem to indicate either that the small amount of hydrogen halide unavoidably present is sufficient for catalytic purposes or that no catalyst is necessary for the reaction.

In order that those skilled in the art better may understand how our invention may be carried into effect, the following specific examples are given illustrating the preparation of representative 2-halogenoethoxy silicon compounds coming within the class of compounds represented by the formula $R_aR'_bSi(OCH_2CH_2X)_{(4-a-b)}$.

*Example 1.—Methyl tri-2-chloroethoxysilane.—* Into a glass reaction vessel equipped with a reflux condenser and a gas inlet tube were placed 183 g. of methyltrichlorosilane. Ethylene oxide gas was introduced through the inlet tube and bubbled through the liquid at 60–100° C. for 12 hours. Fractional distillation of the product at reduced pressure gave an 87 per cent yield of methyl tri-2-chloroethoxysilane having a boiling point of 136–137° C. at 6 mm. pressure.

*Example 2.—Trimethyl-2-chloroethoxysilane.—* The procedure of Example 1 was repeated using 44.3 g. of trimethyl chlorosilane. The ethylene oxide gas (excess) was bubbled through at a temperature of 55–60° C. for 5 hours. The product which was isolated in 80 per cent yield boiled at a temperature of 131–132° C. at 748 mm. pressure.

*Example 3.—Methyldi-2-chloroethoxysilane and tri-2-chloroethoxysilane.—*Into a pressure bottle, the stopper of which was connected by means of a piece of rubber tubing to a tank of ethylene oxide, were placed 200 g. of a mixture of methyldichlorosilane, trichlorosilane and silicon tetrachloride. This mixture was shaken under the full pressure of the liquid ethylene oxide in the tank (14–15 lbs./sq. in.). At first the reaction was quite vigorous and the reaction flask had to be cooled, or the reaction slowed down temporarily by decreasing the gas pressure. At the end of 35 hours the reaction was complete. By fractionation of the reaction products at reduced pressure, the following compounds were obtained:

| Compound | Boiling point, °C. |
| --- | --- |
| $CH_3SiH(OCH_2CH_2Cl)_2$ | 93.5–94.5/15 mm. <br> 70–73/4.5 mm. |
| $HSi(OCH_2CH_2Cl)_3$ | 117–118.5/2 mm. |
| $Si(OCH_2CH_2Cl)_4$ | 159–162/2 mm. |

*Example 4.—Trimethyl-2-chloroethoxysilane and tetrakis-2-chloroethyl silicate.—*Into the apparatus of Example 1 were placed 225 g. of a mixture of silicon tetrachloride and trimethyl chlorosilane containing 65.6 per cent chlorine. Excess ethylene oxide was bubbled through this mixture for 10 hours keeping the temperature at 65–90°. By distillation at atmospheric pressure, 89.7 g. of trimethyl-2-chloroethoxysilane (B. P. 130.5–133°/775 mm.) were obtained. By distillation at reduced pressure the residue yielded 251.2 g. of tetrakis-2-chloroethyl silicate (B. P. 175–177°/5 mm.).

It is to be understood that our invention is not limited to the formation of the specific compounds described in the above examples. Examples of other compounds, together with their formulae and boiling points which have been prepared by reacting ethylene oxide with appropriate halogenosilanes, or alkyl or aryl substituted halogenosilanes are the following:

| Compound | Formula | Boiling point |
|---|---|---|
| Dimethyl-2-chloroethoxysilane | $(CH_3)_2Si(OCH_2CH_2Cl)_2$ | 212–213° C./758 mm. |
| Methyldi-2-chloroethoxysilane | $CH_3SiH(OCH_2CH_2Cl)_2$ | 97° C./18 mm. |
| Phenyltri-2-chloroethoxysilane | $C_6H_5Si(OCH_2CH_2Cl)_3$ | 158°/1 mm. |
| Methyltri-2-bromoethoxysilane | $CH_3Si(OCH_2CH_2Br)_3$ | 131°/1 mm. |
| Dimethyldi-2-bromoethoxysilane | $(CH_3)_2Si(OCH_2CH_2Br)_2$ | 92°/2.5 mm. |
| Diphenyldi-2-chloroethoxysilane | $(C_6H_5)_2Si(OCH_2CH_2Cl)_2$ | 142–146°/0.1 mm. |

The novel ethers described herein are useful as solvents, high-boiling liquids, and lubricants. They are readily hydrolyzed and may be used as intermediates in the formation of more complex or resinous organosilicon compounds similar to those described for example in Patent 2,258,218 issued to Eugene G. Rochow.

What we claim as new and desire to secure by Letters Patent of the United States, is:

1. Halogenoethoxy silicon compounds corresponding to the general formula $$R_aR'_bSi(OCH_2CH_2X)_{(4-a-b)}$$

wherein R is a member of the class consisting of hydrogen and monovalent alkyl and aryl radicals, R' is a member of the class consisting of monovalent alkyl and aryl radicals and $XCH_2CH_2O-$ radicals, X is a halogen atom selected from the class consisting of chlorine and bromine, $a$ and $b$ are integers and are equal to at least 1, and the sum of $a+b$ is not greater than 3.

2. Phenyltri-2-chloroethoxysilane.
3. Trimethyl-2-chloroethoxysilane.
4. Methyldi-2-chloroethoxysilane.
5. The method of preparing halogenoethoxy silicon compounds which comprises effecting reaction at an elevated temperature between ethylene oxide and a halogenosilane having the general formula $$R_aR'_bSiX_{(4-a-b)}$$

wherein R represents a member of the class consisting of hydrogen and monovalent alkyl and aryl radicals, R' represents a member of the class consisting of monovalent alkyl and aryl radicals, X represents a halogen atom selected from the class consisting of chlorine and bromine, and $a$ and $b$ are integers and are equal to at least 1, the sum of $a+b$ being not greater than 3.

WINTON I. PATNODE.
ROBERT O. SAUER.